United States Patent Office 2,789,957
Patented Apr. 23, 1957

2,789,957
BENZOATES OF ALKYLATED PHENOLS

Mark W. Pollock, New York, N. Y., assignor to Argus Chemical Corporation, a corporation of New York No Drawing. Application March 18, 1955,
Serial No. 495,330

4 Claims. (Cl. 260—31.2)

This invention relates to new esters of benzoic acid and alkylated phenols with one or two alkyl side chains, these side chains having together at least 9 and at the utmost 18 carbon atoms. These products are of particular interest as plasticizers for polyvinyl chloride resins and copolymers of vinyl chloride.

Examples of phenols, which may serve as starting materials for our new benzoates, are for instance nonylphenol, dodecylphenol, octylcresol, nonylcresol, diamylphenol, dioctylphenol, and dinonylphenol. The benzoates of these phenols are prepared in known ways, as, for instance, by the Schrotten-Baumann benzoylation or by direct heating of the phenol with benzoylchloride or other benzoylating agents.

It has been known heretofore that synthetic resin compositions may be prepared from polymers and copolymers of vinylchloride by plasticizing these products with compatible organic compounds which are of low volatility at elevated temperatures. Among the plasticizers used are esters such as tricresylphosphate and various esters of phthalic acid. Di - 2 - ethylhexphthalate (D. O. P.) is the most used plasticizer and, therefore, the standard for comparison.

I have discovered that our new benzoates of alkylphenols, as described herein, have certain outstanding properties as plasticizers for polyvinylchloride resins.

This invention provides compositions of polyvinylchloride resins containing the new benzoates as sole plasticizers or in combination with other commercial plasticizers.

When polyvinylchloride resins containing the benzoate plasticizer are compared with like compositions in which the benzoate is substituted by D. O. P. there are certain particular advantages. Polyvinylchloride resins plasticized with our benzoates are much stiffer than when plasticized with D. O. P. in equal proportions. This extra stiffness makes the new compounds particularly satisfactory in various applications. In order to obtain equal flexibility, we may use substantially higher percentages of the new plasticizers than when working with D. O. P. In this way we lower the cost per pound of the finished plastic for a given flexibility and tensile strength, our benzoates being relatively low in cost as compared to polyvinylchloride resin.

Also our new plasticizers show good compatibility with the resin, good light and heat stability and low rate of volatilization under usual processing conditions.

The polyvinylchloride resins used in our new compositions may be 100% polyvinylchloride or copolymers of vinylchloride with vinyl acetate, vinylidenechloride, styrene and fumaric or maleic acid esters with a predominating proportion of polyvinylchloride.

Stabilizers may be and suitably are used in manufacturing our new compositions. These are any one or a mixture of two or more stabilizers commonly employed in polyvinylchloride resin plastics. Examples are mixed barium and cadmium laurate and trialkylphosphite mixtures as well as lead and tin stabilizers.

Other commercial plasticizers may be used in combination with the benzoates of the alkylphenols. Thus we may mix with our benzoates for instance tricresyl or trioctylphosphate, dioctylphthalate and other phthalic acid esters or dipropylene glycol dibenzoate.

In the following examples and elsewhere herein proportions are being expressed as parts by weight unless otherwise stated to the contrary.

EXAMPLE 1
Dodecylphenylbenzoate 52.4 parts (0.2 mol) of commercial dodecylphenol were mixed with 16 parts of pyridine as acid acceptor. The mixture of these materials was heated to 100° C. with agitation. 31 parts of benzoyl chloride (a slight excess over 0.2 mol) were introduced slowly during one hour, with agitation, and the reaction and agitation continued at approximately 100° C. for 4 hours more. This treatment completes the reaction. The reaction product was subsequently washed twice with hot water and the two layers separated after each washing by difference of specific gravity. The organic layer was dried, in the laboratory with anhydrous sodium sulfate, and then vacuum distilled.

The main fraction boiling at 190°–215° C. at approximately 1 mm. pressure was accepted as dodecylphenyl benzoate of purity satisfactory for use as a plasticizer of polyvinyl chloride resins. This material is a colorless viscous liquid. The yield of this fraction was 66 parts corresponding to approximately 90% of the weight of dodecylphenyl benzoate theoretically possible in the reaction.

Tests showed the following: saponification value 149 as compared to 153 calculated; $N_D^{23°}=1,5315$; and specific gravity (21.5°) 1.01.

EXAMPLE 2
Nonylphenylbenzoate 220 parts commercial nonylphenol (1 mol) were mixed with the equal amount of benzoylchloride (1.56 mol) and heated. The temperature was raised little by little and eventually brought up to 150° C. The mixture was kept at this temperature for 8 hours, when evolution of HCl gas had ceased. Subsequently the excess of benzoylchloride was topped off in vacuo and the residue fractionated. The main fraction boiled at 180°–200° C. at 2 mm. pressure. H represents a practically water white liquid with a refractive index $n_D^{25°}$ 1,5378 and a specific gravity of 1.02 at 21° C. Saponification value found 168, calculated 173. Yield 285 g. (i. e. 88% of theory on basis of the nonylphenol).

In similar ways (using the appropriate phenols), nonylcresyl, dinonylphenyl, and diamylphenyl benzoate were prepared. In appearance, specific gravity, and refractive indices they are very close to the products described in Examples 1 and 2.

The use of the benzoate esters in the manufacture of polyvinyl chloride resin plastics will be illustrated in the following examples.

Example 3

100 parts Geon 101 EP (polyvinyl chloride), 45 parts dodecylphenyl benzoate, and 2 parts of barium and cadmium laurate mixed with 0.5 part of trioctyl phosphite as the stabilizer mixture were used in making a plastic. The ingredients were compounded on a hot two-roll mill and sheeted off, the temperature of milling and sheeting being 300°–350° F. The sheeted material was then molded in a press to test slabs of 0.075 inch thickness. Volatility was determined by heating a slab of this thickness at 260° F. for 24 hours. The loss in weight was compared with that for a similarly made plastic including dioctyl phthalate in place of the benzoate plasticizer.

| Plasticizer | Loss in Weight at 260° F. for 24 hours, percent |
|---|---|
| Dioctyl phthalate (D. O. P.) | 2.73 |
| Dodecylphenyl benzoate | 2.57 |

The sheets of plastic containing the dodecylphenyl benzoate plasticizer were more stiff than the sheets with dioctyl phthalate.

*Example 4*

The procedure of Example 3 was followed except that the proportion of the dodecylphenyl benzoate was made 100 parts for 100 of the polyvinyl chloride resin. The resulting sheeted and molded material was compared with a composition made in like manner but with the use of only 55 parts of dioctyl phthalate as the plasticizer. Modulus and tensile strength tests showed the following:

| Plasticizer | Modulus at 100% Elongation | Tensile Strength (p. s. i.) |
|---|---|---|
| Dioctyl phthalate, 55 parts | 1,255 | 2,415 |
| Dodecylphenyl benzoate 100 parts | 1,303 | 2,037 |

This data shows that modulus and tensile strength values, obtained with the relatively inexpensive dodecylphenyl benzoate when used in the proportion of about 1.8 times that of the dioctyl phthalate, differed only moderately from those with the smaller proportion of the phthalate standard. The saving in manufacturing the plastic by using the benzoate plasticizer is evident.

*Example 5*

This economy of polyvinyl chloride resin possible with our plasticizers was further demonstrated by making the plasticizer nonylphenyl benzoate and the proportion of it 45, 55, and 65 parts, respectively, in separate preparations made otherwise as described in Example 3. The resulting plastic was then compared with similarly made material containing 45 parts of dioctyl phthalate as plasticizer. The results of the tests follow:

| Plasticizer and Parts | Modulus at 100% Elongation | Tensile Strength (p. s. i.) |
|---|---|---|
| Dioctyl phthalate, 45 | 1,860 | 2,654 |
| Nonylphenyl benzoate, 45 | 2,760 | 2,865 |
| Nonylphenyl benzoate, 55 | 2,320 | 2,790 |
| Nonylphenyl benzoate, 65 | 1,850 | 2,570 |

The modulus and tensile strength are higher with the 55 parts of the benzoate plasticizer than with 45 of the the dioctyl phthalate. In fact, these two properties are satisfactory, although slightly lower, when the finished plastic contains as much as 65 parts of the benzoate.

*Example 6*

A composition of 100 parts VYNW (a copolymer of 96% vinyl chloride and 4% vinyl acetate) 25 parts dioctyl phthalate, 20 parts nonylphenyl benzoate, and 2 parts of barium and cadmium laurate and 1 part of trioctylphosphite as stabilizer mixture were compounded and sheeted as described in Example 3.

A similar mix was made using 20 parts of the nonylcresyl benzoate in place of the nonylphenyl benzoate. Tests show the following:

| Mixture of Dioctyl Phthalate 25 parts with 20 parts of— | Modulus at 100% Elongation | Tensile Strength (p. s. i.) |
|---|---|---|
| Nonylphenyl benzoate | 2,243 | 2,863 |
| Nonylcresyl benzoate | 2,428 | 2,900 |

This comparison shows that the mixtures of the two plasticizers are satisfactory.

The proportion of the total plasticizer may be varied widely, as from 5–125 parts for 100 of the resin.

*Example 7*

The procedure of any of the Examples 3–6 is followed with the substitution of (1) any of the benzoates of other mono- or dialkyl substituted phenols included herein for the substituted phenol of the said examples, (2) any of the other conventional plasticizers listed for the dioctyl phthalate, and (3) any of the other stabilizers for the laurate and phosphite mixture.

It will be understood that it is intended to cover all changes and modifications of the examples of the invention herein chosen for the purpose of illustration which do not constitute departures from the spirit and scope of the invention.

What is claimed is:

1. A plasticized resin composition comprising polyvinylchloride resin and, as plasticizer therefor, a liquid ester of benzoic acid with a phenol having one to two alkyl side chains containing together 9–18 carbon atoms in the alkyl component.

2. The composition of claim 1, in which the plasticizer is nonylphenyl benzoate.

3. The composition of claim 1, in which the plasticizer is dodecylphenylbenzoate.

4. The composition of claim 1, in which the plasticizer is nonylcresyl benzoate.

References Cited in the file of this patent

UNITED STATES PATENTS

| 2,211,467 | Kimball et al. | Aug. 13, 1940 |
| 2,500,901 | Monroe et al. | Mar. 14, 1950 |
| 2,520,084 | Dazzi | Aug. 22, 1950 |
| 2,612,489 | Havens | Sept. 30, 1952 |
| 2,666,039 | Reid et al. | Jan. 12, 1954 |